Aug. 22, 1944.   K. HESSENBERG   2,356,589
ELECTRIC VALVE CIRCUIT
Filed July 1, 1939
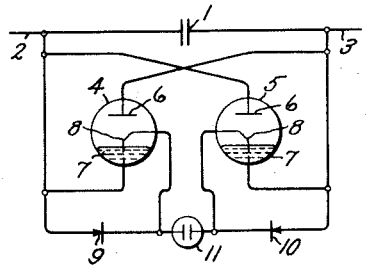
Fig. 1.
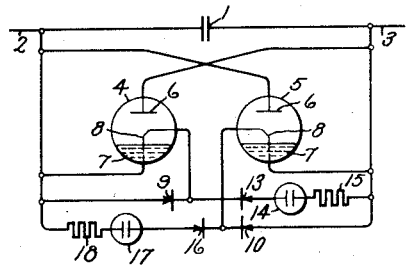
Fig. 2.
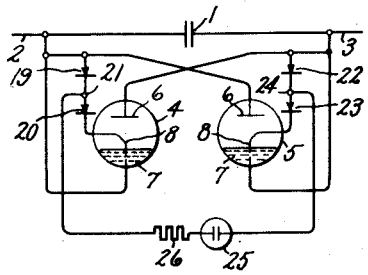
Fig. 3.
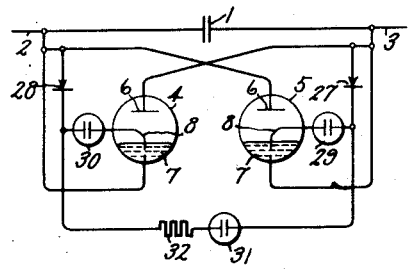
Fig. 4.
Fig. 5.
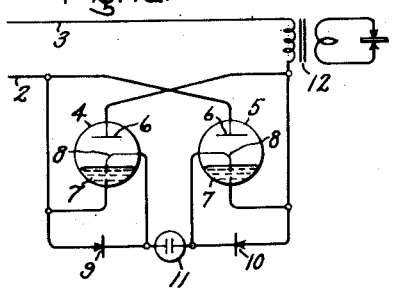
Fig. 1a.
Inventor:
Karl Hessenberg.
by Harry E. Dunham
His Attorney.

Patented Aug. 22, 1944

2,356,589

UNITED STATES PATENT OFFICE 2,356,589

ELECTRIC VALVE CIRCUITS

Karl Hessenberg, Berlin-Charlottenburg, Germany, assignor to General Electric Company, a corporation of New York Application July 1, 1939, Serial No. 282,538
In Germany November 26, 1938

9 Claims. (Cl. 175—294)

My invention relates to electric valve circuits and more particularly to control or excitation circuits for electric valve means of the controlled type.

In the application of electric valve apparatus, it is important in many applications to employ control or excitation circuits which are responsive to voltages of predetermined magnitude in order to initiate the operation of the electric valve means to perform their intended function. For example, in the use of electric valve means for the protection of electrical apparatus, it is important to render the electric valve means conductive or non-conductive precisely in accordance with the magnitude of voltage or current of an associated circuit. Heretofore, the prior art arrangements have utilized control or excitation circuits which are complicated in structure and arrangement and which require numerous replacements and repairs. In accordance with the teachings of my invention described hereinafter, I provide a number of improved control or excitation circuits for electric valve means of the controlled type, particularly of the type employing immersion-ignitor control members, and which obviate the above-mentioned disadvantages of prior art arrangements.

It is an object of my invention to provide new and improved control or excitation circuits for electric valve apparatus.

It is another object of my invention to provide new and improved control or excitation circuits for electric valve means employing immersion-ignitor control members.

It is a further object of my invention to provide new and improved voltage responsive circuits for effecting energization of the control members of electric valve apparatus when the voltage applied thereto attains a predetermined value.

Briefly described, I provide new and improved control circuits for electric valve means of the controlled type which are responsive to a predetermined controlling influence, such as applied voltage. More particularly, I provide voltage responsive excitation circuits for a pair of reversely connected electric valve means which control the energization of a load device from an alternating current supply circuit.

For a better understanding of my invention, reference may be had to the following description taken in connection with the accompanying drawing, and its scope will be pointed out in the appended claims. Figs. 1-5, inclusive, diagrammatically illustrate various embodiments of my invention as applied to a pair of reversely connected electric valve means for controlling the energization of a load device from an alternating current circuit. Fig. 1a represents a modification of the arrangement of Fig. 1 applied to a system for energizing a welding circuit.

Referring now to Fig. 1 of the drawing, my invention is there diagrammatically illustrated as applied to an electric valve system for controlling the energization of a load device, such as a capacitance 1, from an alternating current circuit including conductors 2 and 3. In the particular arrangement shown in Fig. 1, the system is employed to limit the maximum voltage applied to, and hence limits the maximum energization of, the capacitance 1. I provide a pair of reversely connected electric valve means 4 and 5 which are connected with respect to the alternating current circuit so that both half cycles of alternating current may be transmitted thereby. The electric valve means 4 and 5 may be of the type disclosed and claimed in United States Letters Patent No. 2,069,293, granted February 2, 1937, upon an application of J. Slepian et al. Each of the electric valve means 4 and 5 includes an anode 6, a cathode of the self-reconstructing type, such as a mercury pool cathode 7, and an immersion-ignitor control member 8 of a material such as boron-carbide or silicon-carbide which has a specific electrical resistivity large with respect to that of the associated mercury pool cathode 7.

I provide control or excitation circuits for the electric valve means 4 and 5 and which include a pair of unidirectional conducting devices 9 and 10 which are preferably of the contact type, such as that disclosed and claimed in United States Letters Patent No. 1,640,335, granted August 23, 1927, upon an application of Lars O. Grondahl. The unidirectional conducting devices 9 and 10 are associated with electric valve means 4 and 5 and are connected between the associated cathodes 7 and control members 8 thereof. Each of these unidirectional conducting devices is poled in opposition to the normal intended direction of current flow between the control members and the cathodes.

As a means for effecting energization of the immersion-ignitor control members 8 when the voltage of the alternating current circuit attains a predetermined value, I provide a voltage responsive element, such as a glow discharge valve 11, having a critical minimum potential operating characteristic and which is connected between the immersion-ignitor control members 8 and the unidirectional conducting devices 9 and 10.

The operation of the embodiment of my invention shown in Fig. 1 will be explained by considering the system when it is desired to render the electric valve means 4 and 5 conductive when the voltage of the alternating current circuit attains a predetermined value, thereby limiting the energization of the capacitance 1. If it be assumed that the voltage of the alternating current circuit including conductors 2 and 3 attains a predetermined value and if it be assumed that the instantaneous potential of the conductor 3 is positive relative to that of conductor 2, electric valve means 4 will be rendered conductive in the following manner. Under the above stated conditions, the anode 6 of electric valve means 4 is positive relative to the cathode 7 and a unidirectional impulse of current will be transmitted to the immersion-ignitor control member 8 of valve means 4 through the unidirectional conducting device 10 and the glow discharge device 11. Upon such energization of the control member 8, an arc discharge will be initiated in the electric valve means 4 and that electric valve means will be rendered conductive. If the voltage of the alternating current circuit continues at or above the critical value, during the next half cycle of voltage the electric valve means 5 will be rendered conductive by the energization of its control members through a circuit including unidirectional conducting device 9 and the glow discharge device 11.

During the negative half cycles of applied anode-cathode voltage the unidirectional conducting devices 9 and 10 reduce or limit the voltage applied to the immersion-ignitor control members 8. For example, during those half cycles when the conductor 3 is positive relative to conductor 2, unidirectional conducting device 10 conducts positive current in the forward direction and accordingly the voltage drop appearing across its terminals, and hence the voltage drop impressed across control member 8 and cathode 7 of valve means 5, are relatively small. In this manner, the inverse current transmitted between the cathode 7 and the control member 8 is maintained at a relatively low value which tends to increase materially the life of the electric valve means.

It is to be understood that although the embodiment of my invention shown in Fig. 1 has been explained in connection with a voltage limiting arrangement, the control or excitation circuits thereof may be readily employed in circuits where it is desired to effect energization of the control members of a pair of electric valves during the respective half cycles of voltage of the alternating current circuit during a predetermined interval of time, or continuously, if such action is desired. That is, the control or excitation circuits may be arranged so that the glow discharge device 11 breaks down at a desired or predetermined instantaneous value of voltage of the alternating current circuit. Such an arrangement is shown in Fig. 1a and the elements of that figure have been assigned reference numerals corresponding to like elements in Fig. 1.

In Fig. 1a a load device, such as a welding transformer 12, is connected to be energized from the alternating current circuit through electric valve means 4 and 5. It will be readily understood that the welding transformer 12 will be energized from the alternating current circuit including conductors 2 and 3, and that the electric valve means 4 and 5 will be rendered conductive at predetermined times during the respective half cycles of alternating voltage. These times or instants are determined by the design of the respective control or excitation circuits for the electric valve means 4 and 5 and which include glow discharge device 11.

In Fig. 2 there is diagrammatically illustrated another embodiment of my invention for effecting energization of the immersion-ignitor control members 8 of the electric valve means when the voltage of the associated alternating current circuit attains a predetermined value. I provide a pair of circuits each associated with a different one of the electric valve means for transmitting unidirectional impulses to the associated control member 8. One of the control circuits which is associated with electric valve means 4 may include in series relation a unidirectional conducting device 13, a voltage responsive element having a critical minimum potential operating characteristic, such as a glow discharge valve 14, and a current limiting impedance such as a resistance 15. These three elements connected in series relation are connected between the anode 6 of the electric valve means 4 and its associated control member 8. In like manner, I provide a control circuit for the electric valve means 5 and this control circuit may comprise a unidirectional conducting device 16, a glow discharge valve 17 and a current limiting impedance or resistance 18. The unidirectional conducting devices 13 and 16 are also preferably of the contact type, offering a relatively low resistance to the flow of current in one direction and a relatively large resistance to the flow of current in the reverse direction.

The operation of the embodiment of my invention shown in Fig. 2 will be explained by considering the system when the voltage of the alternating current circuit attains a predetermined value at which it is desired to render the electric valve means 4 and 5 conductive. If it be assumed that conductor 3 is positive relative to conductor 2 and that the voltage attains the critical value, control member 8 of electric valve means 4 will be energized in the following manner. Under this condition, it will be understood that the following elements conduct current in series relation: the resistance 15, glow discharge device 14 and unidirectional conducting devices 13 and 9. It will be understood that by virtue of the aforesaid polarity, positive current will be transmitted from conductor 3 to conductor 2 since the glow discharge device 4 has been rendered conductive. The voltage drop across the unidirectional conducting device 13 will be quite small, whereas the voltage drop across the unidirectional conducting device 9 will be large due to the fact that it is connected to oppose the flow of positive current in that direction. Accordingly, there is impressed across the control member 8 and the cathode 7 of electric valve means 4 a relatively large voltage and, of course, a positive unidirectional impulse of current will be transmitted between the control member 8 and the cathode 7 to render the electric valve 4 conductive. During negative half cycles of applied anode-cathode voltage, as, for example, during the half cycle of voltage of the above-stated polarity, the voltage impressed between the control member 8 and the cathode 7 of electric valve means 5 is limited by means of the unidirectional conducting device 10. Unidirectional conducting device 9 limits the voltage impressed between its control member and cathode during the negative half cycles of anode-cathode voltage applied to electric valve means 4.

Of course, during the half cycles of voltage in which conductors 2 is positive relative to conductor 3, control member 8 of electric valve means 5 will be supplied with positive unidirectional impulses of current through a circuit including resistance 18, glow discharge device 17 and unidirectional conducting device 16.

Fig. 3 diagrammatically illustrates a still further embodiment of my invention as applied to electric valve means 4 and 5 which control the energization of the capacitance 1. I provide a pair of excitation circuits associated with electric valve means 4 and 5. One of these excitation circuits includes a pair of serially connected unidirectional conducting devices 19 and 20 having a common juncture 21, and the other excitation circuit includes a pair of serially connected unidirectional conducting devices 22 and 23 having a common juncture 24. It will be noted that between the common junctures 21 and 24, I provide a circuit including a voltage responsive element, such as a glow discharge device 25, having a critical minimum potential operating characteristic. A suitable current limiting device, such as a resistance 26, may be connected in series relation with the glow discharge device 25.

The control circuits of Fig. 3 operate to render the electric valve means 4 and 5 conductive when the voltage of the alternating current circuit attains a predetermined value. If it be assumed that conductor 3 is positive relative to conductor 2, a unidirectional positive impulse of current will be transmitted to the control member 8 of electric valve means 4 when the voltage attains a predetermined value. This unidirectional impulse of current will be transmitted through unidirectional conducting device 22, glow discharge device 25, a resistance 26 and unidirectional conducting device 20. In like manner, when the conductor 2 is positive relative to conductor 3, control member 8 of electric valve means 5 will be energized by a circuit including unidirectional conducting device 19, resistance 26, glow discharge device 25 and unidirectional conducting device 23.

By virtue of the series connection of the unidirectional conducting devices 19, 20 and 22, 23, the voltage and hence the current supplied to the control members 8 during the negative half cycles of applied anode-cathode voltage are limited to a very small value. This protective or limiting feature may be explained by considering the operation of the arrangement during the half cycles when the conductor 3 is positive relative to conductor 2. Of course, these cycles correspond to the negative half cycles or inverse half cycles of anode-cathode voltage for electric valve means 5. During the negative half cycles of applied anode-cathode voltage the potential difference or the voltage applied across the control member 8 and the cathode 7 is limited by the serially connected unidirectional conducting devices 22 and 23 which are connected in a closed circuit.

Fig. 4 illustrates a still further embodiment of my invention for rendering the electric valve means 4 and 5 conductive when the voltage of the alternating current circuit attains a predetermined value. The control members 8 of the electric valve means 5 and 4 are connected to conductors 3 and 2, respectively, through circuits including unidirectional conducting devices 27 and 28 and voltage responsive elements having critical minimum potential operating characteristics, such as glow discharge devices 29 and 30, respectively. Between the common junctures of unidirectional conducting device 27 and glow discharge device 29 and unidirectional conducting device 28 and glow discharge device 30, I provide a glow discharge device 31. A current limiting resistance 32 may be connected in series relation with the glow discharge device 31, if desired.

When the voltage of the alternating current circuit including conductors 2 and 3 attains a predetermined value, the control members 8 are energized in the following manner. If conductor 3 is positive relative to conductor 2, the electric valve means 4 will be rendered conductive by the energization of the control member 8 thereof through a circuit including unidirectional conducting device 27, glow discharge device 31, resistance 32 and glow discharge device 30. Since the voltage appearing across the terminal device 29 is small, this device will not be rendered conductive. During the succeeding half cycle of voltage, if the voltage of the alternating current circuit is still greater than the critical value, control member 8 of electric valve means 5 will be rendered conductive by the energization of its control member 8 through a circuit including unidirectional conducting device 28, resistance 32, glow discharge device 31 and glow discharge device 29. Of course, the glow discharge devices 29 and 30 are both rendered conductive as the voltage of the alternating current circuit reaches the critical value for those electric valves connected in series relation. Since the voltage appearing across the terminals of glow discharge device 30 is below the critical value for that valve, it will not be rendered conductive.

A still further embodiment of my invention is shown in Fig. 5 which is similar in many respects to that shown in Fig. 4, and corresponding elements have been assigned like reference numerals. In order to accentuate or amplify the impulses of current transmitted to the control members 8 when the voltage of the alternating current circuit attains the predetermined critical value, I provide capacitances 33 and 34 which are discharged when the glow discharge devices 30 and 29, respectively, are rendered conductive. An impedance element, such as a resistance 35, may be connected in the anode-cathode circuits of the electric valve means 4 and 5 to limit the current thereof. This resistance also serves as a damping element to prevent the establishment of oscillations in the circuit due to the presence of the capacitances 33 and 34. The resistance 35 may also be designed so that the voltage appearing between conductors 2 and 3 does not exceed a predetermined value for which the system is designed to operate.

The operation of the arrangement shown in Fig. 5 is substantially the same as that explained in connection with Fig. 4. If conductor 3 is positive in polarity relative to conductor 2 and if the voltage attains a predetermined value, control member 8 of electric valve means 4 is rendered conductive in the following manner. Capacitance 33, which has been previously charged so that its right-hand plate is positive, is discharged through the control member 8 through a circuit including the glow discharge device 30. Of course, the glow discharge device 30 is rendered conductive when the voltage applied across its terminals exceeds a predetermined critical value. The positive voltage derived from conductors 2 and 3 is applied to the terminals of device 30 and is obtained through a circuit including resistance 35, unidirectional conducting device 27, glow discharge device 31, resistance 32, glow discharge device 30, control member 8, and cathode 7. The glow discharge devices 30 and 31 are connected in series relation and the voltage impressed across the aforesaid circuit must attain a resultant critical value established by the sum of the individual critical values of these two glow discharge devices. When the voltage attains this value, a unidirectional impulse of current is transmitted to the control member 8 of electric valve means 4. When glow discharge valve 30 is rendered conductive, capacitance 33, which has been pre-charged, is discharged through a circuit including glow discharge device 30, control member 8 and cathode 7. Likewise, control member 8 of electric valve means 5 is rendered conductive during the succeeding half cycle of voltage when conductor 2 is positive relative to conductor 3. In that case, the capacitance 34 is discharged through glow discharge device 29 to effect energization of the control member 8 of electric valve means 5.

While I have shown and described my invention as applied to particular systems of connections and as embodying various devices diagrammatically shown, it will be obvious to those skilled in the art that changes and modifications may be made without departing from my invention, and I, therefore, aim in the appended claims to cover all such changes and modifications as fall within the true spirit and scope of my invention.

What I claim as new and desire to secure by Letters Patent of the United States is:

1. In combination, an alternating current circuit, a load device, means for controlling the energization of said load device and comprising a pair of electric valves reversely connected with respect to said alternating current circuit and each comprising an anode, a cathode and a control member, a pair of unidirectional conducting devices, each one of said devices being associated with a different one of said electric valves and each being poled in opposition to the normal direction of current flow between the control member and the associated cathode, and means responsive to the magnitude of the voltage of said alternating current circuit for effecting energization of the control members comprising glow discharge means, having a critical minimum operating potential characteristic, connected between the control members.

2. In combination, an alternating current circuit, a load device, a pair of reversely connected electric valve means connected in series relation with said alternating current circuit and said load device and each comprising an anode, a cathode and a control member of the immersion-ignitor type in electrical contact with the associated cathode, a pair of unidirectional conducting devices each associated with a different one of said electric valves and each being poled in opposition to the normal intended direction of current flow between the control member and the associated cathode, and means responsive to the magnitude of the voltage of said alternating current circuit for transmitting unidirectional impulses of current to the control members during each half cycle of positive applied anode-cathode voltage and comprising a glow discharge device, having a critical minimum operating potential characteristic, connected between the control members.

3. In combination, an alternating current circuit, a load device, and means for limiting the voltage applied to said load device by said alternating current circuit and comprising a pair of reversely connected electric valve means connected across said load device, said electric valve means each having an anode, a cathode and a control member, a pair of unidirectional conducting devices, each one of said devices being associated with a different one of said electric valves and each being poled in opposition to the normal intended direction of current flow between the associated control member and cathode, and a glow discharge device having a critical minimum potential operating characteristic, connected between the control members for effecting energization of the respective control members through the unidirectional conducting device associated with the other electric valve means when the voltage impressed across said load device attains a predetermined value.

4. In combination, an alternating current circuit, a load device, and means for controlling the energization of said load device comprising a pair of reversely connected electric valve means each including an anode, a cathode and a control member, a pair of unidirectional conducting devices each connected between the cathode and control member of a different one of said electric valve means and being poled in opposition to the normal intended direction of current flow between the associated control member and cathode and a pair of electric circuits each associated with a different one of said electric valve means and each being connected between the anode and the control member of that electric valve means and comprising a serially connected unidirectional conducting device and a glow discharge device having a critical minimum potential operating characteristic.

5. In combination, an alternating current circuit, a load device, and means for controlling the energization of said load device comprising a pair of reversely connected electric valve means each including an anode, a cathode and a control member, a pair of unidirectional conducting devices each connected between the cathode and control member of a different one of said electric valve means and being poled in opposition to the normal intended direction of current flow between the control members and the cathode and a pair of electric circuits each associated with a different one of said electric valve means and each being connected between the anode and the control member of that electric valve means and each comprising in series relation a unidirectional conducting device, a glow discharge device having a critical minimum potential operating characteristic and a current limiting impedance.

6. In combination, an alternating current circuit, a load device, means for controlling the energization of said load device and comprising a pair of reversely connected electric valve means each having an anode, a cathode and a control member, two pairs of serially connected unidirectional conducting devices each pair being connected between the anode of one of said electric valve means and the control member of the other electric valve means, and a circuit connected between the common junctures of said serially connected unidirectional conducting devices.

7. In combination, an alternating current circuit, a load device, means for controlling the energization of said load device and comprising a pair of reversely connected electric valve means each having an anode, a cathode, and a control member, two pairs of serially connected unidirectional conducting devices, each pair being connected between the anode of one of said electric valves and the control member of the other electric valve, and a circuit connected between the junctures of the pairs of serially connected unidirectional conducting devices and comprising a glow discharge device having a critical minimum potential operating characteristic.

8. In combination, with a source of current an ignitron having a cathode connected to one terminal of said source, an anode connected to the other terminal of said source and an ignition electrode, means interconnecting said cathode and said ignition electrode and including at least a first rectifier and a second rectifier connected to conduct current from said cathode to said ignition electrode, current conducting means for supplying ignition current to said ignition electrode connected to the electrical junction between said rectifiers and to the other terminal of said source.

9. In combination, with a source of alternating current a first ignitron having an anode, a cathode and an ignition electrode, a second ignitron having an anode, a cathode and an ignition electrode, means for connecting the anode of said first ignitron and the cathode of said second ignitron to one terminal of said source, means for connecting the cathode of the first ignitron and the anode of said second ignitron to the other terminal of said source, means interconnecting the cathode and the ignition electrode of said first ignitron including a first plurality of rectifiers connected to conduct current from the said cathode to the said ignition electrode, means interconnecting the cathode and the ignition electrode of said second ignitron including a second plurality of rectifiers connected to conduct current from the said cathode to the said ignition electrode and current conducting means interconnecting points between the first plurality of rectifiers and the second plurality of rectifiers.

KARL HESSENBERG.

CERTIFICATE OF CORRECTION.

Patent No. 2,356,589. August 22, 1944.

KARL HESSENBERG.

It is hereby certified that error appears in the printed specification of the above numbered patent requiring correction as follows: Page 1, second column, line 23, for the patent number "2,069,293" read --2,069,283--; and that the said Letters Patent should be read with this correction therein that the same may conform to the record of the case in the Patent Office.

Signed and sealed this 10th day of October, A. D. 1944.

Henry Van Arsdale (Seal)                 Acting Commissioner of Patents.